Jan. 31, 1967     H. A. STEINBERG     3,301,171

FOOD JUICE DEFLECTOR MEANS FOR SOLAR OVEN

Filed March 29, 1963

*INVENTOR.*
Hyman A. Steinberg

United States Patent Office 3,301,171
Patented Jan. 31, 1967

3,301,171
FOOD JUICE DEFLECTOR MEANS FOR SOLAR OVEN
Hyman A. Steinberg, 7—25 166th St.,
Whitestone, N.Y. 11357
Filed Mar. 29, 1963, Ser. No. 268,986
8 Claims. (Cl. 99—425)

This invention relates to solar ovens of the type having a substantially flat heating collector plate in contact with the rim of a food pan. More particularly, the present invention is directed to novel means for deflecting food juices running down the surface of the tilted collector plate into the food pan.

Solar ovens essentially comprise wall means or the like defining a food heating chamber including, generally, a collector plate of heat absorbing and conducting material, and further comprise means for concentrating solar heat energy on to the collector plate to elevate the temperature of the food chamber.

In one form of solar oven which has been practically successful, there is a casing means of essentially heat insulating material defining the food heating chamber, which latter has a pair of substantially parallel walls. The normally uppermost one of these walls constitutes a substantially flat metallic collector plate. The casing means includes a body structure, which is essentially in the form of a walled chamber which is open at both surfaces of the body means, and a cover. The aforementioned collector plate is disposed adjacent the inner end surface of the body, and means are provided at the other end surface of the body to reflect solar energy onto the collector plate.

The food heating chamber is defined by a space in the means body beneath the collector plate, and further by the cover which is of heat insulating material and is hingedly connected to the body of the casing. The inner surface of the cover is provided with means for locating and positioning the food pan. The latter may be made of a suitable heat conductive material such as, for example, metal foil or the like, and includes a bottom wall engageable with the normally lowermost wall of the food chamber, which is constituted by the inner surface of the cover, and side and end walls for contacting the collector plate.

During use of the solar oven, the latter is usually tilted in the direction of the sun so that one edge of the collector plate is lower than the other edge, and correspondingly one end of the pan is lower than the other end thereof. The normally lower end wall of the pan may be formed in such a manner as to define retaining means for heated food juices, such as fats, gravy, or the like, which tend to run down toward the lower end wall of the pan.

However, during heating of the food the food is often in contact with the collector plate, and additionally there is substantial splatter of the heated juices so that the latter tend to impinge upon the surface of the collector plate. Those food juices tend to run down the collector plate and, as the seal between the rim of the food pan and the collector plate generally is not perfect at all points, some of the juices running down the surface of the collector plate flow outside the pan and tend to accumulate and harden on surfaces of the food heating chamber exterior to the pan side walls and in crevices of the exterior casing. Often these juices will leak completely out of the oven and drop on the ground below. This presents a cleaning problem and is an undesirable condition.

In accordance with the present invention, such dropping and loss of food juices is prevented in a novel manner. More specifically, the surface of the collector plate contacting the rim of the food pan is formed with ledge means extending transversely thereof adjacent the lower end wall of the food pan and projecting from the collector plate surface toward the pan. This ledge means is arranged to extend within the pan adjacent the lower rim thereof, and thus to deflect food juices running down the tilted collector plate into the food pan so that all of the juices are retained in the food pan.

Preferably, the ledge means on the inner surface of the collector plate is generally angular in cross-section, including one leg which is secured to the inner surface of the grill by welding, cementing, or the like, and a second leg which extends from the inner surface of the collector plate to project within the food pan. This ledge extends the full length of the lower side wall of the pan, and may have legs extending part way along the side edges of the pan or even for the full length thereof. Alternatively, the ledge may be continuous, and extend into the pan completely around the inner periphery of the side and end walls of the pan.

The ledge may be made of a suitable molded plastic such as a fluoro carbon or phenolic composition, or it may be made of metal. For example, the ledge may be a molded plastic, such as polytetrafluorethylene, marketed as "Teflon," or such as phenolformaldehyde. The particular means used to secure the ledge means to the inner surface of the collector plate will be largely dependent upon the composition of the ledge means. In the case where the ledge means is formed of a molded plastic, the ledge means may be secured to the inner surface of the collector plate by the use of a suitable cement. A suitable cement is an organosilicon compound, such as "Silastic" silicone rubber cement (a dimethyl siloxane polymer). If the ledge means is of metal, it may be welded, riveted or brazed to the inner surface of the collector plate, or may be cemented.

For an understanding of the principles of the present invention, reference is made to the following description of typical embodiments thereof as illustrated in the accompanying drawings. In the drawings.

Figure 1:
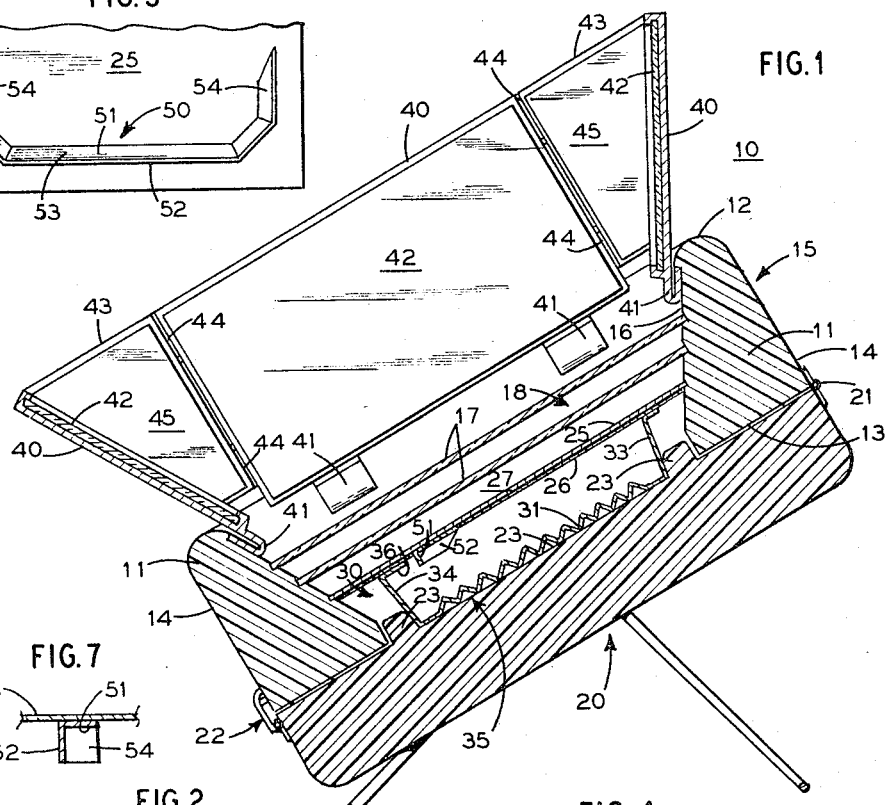
FIG. 1 is a transverse sectional view of a solar oven, incorporating the invention, illustrating the oven as tilted during use and illustrating one embodiment of the juice diverting means of the invention.
Figure 7:
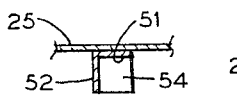
FIG. 7 is a sectional view on the line 7—7 of FIG. 4.
Figure 2:
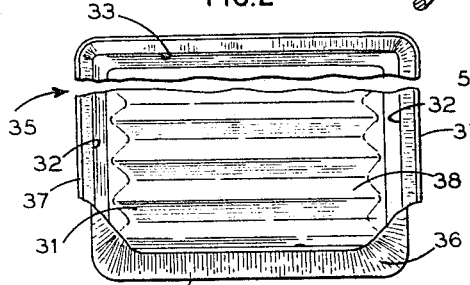
FIG. 2 is a plan view of a typical food pan which may be used with the invention.

Referring first to FIGS. 1 and 2, a solar oven is indicated at 10 as including a casing means including a body 15 and a cover 20. The casing means is generally rectangular in plan, and body 15 comprises four side walls 11 extending between the outer and inner end surfaces 12 and 13 of the body surfaces 12 and 13 lying in substantially parallel planes perpendicular to the exterior surfaces 14 of the walls 11. The inner surfaces 16 of the body side walls 11 extend at an angle to the outer surfaces 14 thereof, so as to define an inwardly converging opening through the body 15. In the illustrated solar oven, the inner surfaces 16 extend at an angle of substantially 60 degrees to the end planes 12 and 13 of the body.

Cover 20 is hinged to body 15 by hinge means indicated at 21, and may be retained in closed position by releasable latch means indicated at 22. Cover 20 is arranged to close the inner end of body 15 and to have, in the closed position, substantial contact with the inner end surface 13 of body 15.

At a short distance inwardly from the outer end surface 12 of body 15, a pair of substantially parallel plates 17 of transparent material are mounted on ledges 18 in the inner surfaces 16 of walls 11, these plates 17 preferably being in sealing relation with the surfaces 16 of walls 11 so as to define a substantially dead air space therebetween. Inwardly of the innermost plate 17, there is a substantially flat collector plate 25 of heat absorbing and conductive material, such as a suitable metal which may be blackened or treated so as to increase its solar energy absorption. The inner surface of collector plate 25 may be coated with a suitable plastic material 26, such as fluorocarbon or silicone resin, to which food particles will not adhere and which is heat resistant. Collector plate 25 is also supported in ledges in the inner surfaces 16 of side walls 11, and is preferably in sealing relation with the inner surfaces of the side walls, so as to define a dead air space 27 between the innermost plate 17 and the collector plate 25.

It will be noted that collector plate 25 is spaced outwardly from the major portion of the inner surface 23 of cover 20. Collector plate 25, conjointly with surface 23 and the portions of side walls 16 inwardly of collector plate 25 define a pan receiving chamber generally indicated at 30. Chamber 30 is arranged to receive a food pan 35 which, in the embodiment illustrated is substantially rectangular in plan and somewhat smaller in area than the collector plate 25. Pan 35 includes a bottom wall 31, arranged to rest on the inner surface 23 of cover 20, a pair of substantially parallel side walls 32, an upper end wall 33, and a lower end wall 34, the terms "upper" and "lower" referring to the orientation of the pan when the solar oven is tilted as it is during normal use.

Pan 35 is preferably formed, in any suitable manner, from metal foil, such as aluminum foil, and bottom wall 71 may be formed with ridges or ribs 38 extending substantially parallel to end walls 33 and 34. The upper edges of side walls 32 and of end wall 33 may be suitably reinforced by plural folds of the foil, as indicated at 37. The upper edge of the lower end wall 34 is formed with a substantially flat inwardly directed flange 36 which is arranged to lie in substantially planar contact with the grill 25.

To retain pan 35 in position, the inner surface 23 of cover 20 may be formed with suitable retaining means, herein illustrated as a rib 23 shaped to conform to the lower edges of the side and end walls of the pan 35. The spacing of surface 23 of cover 20 from grill 25, in the closed position of cover 20, is such that the reinforced edges 37 of the side walls and of the end wall 33, and the flange 36 of end wall 34, are maintained in contact with the inner surface 26 of collector plate 25.

The opening in the outer surface 12 of body 15 may be closed by a plurality of walls 40 each hinged at its inner edge to the inner surface 16 of a wall 11 of body 10, as indicated at 41. Each wall 40 extends, in the open position thereof, substantially parallel to the inner surface 16 of its associated wall 11. Furthermore, each wall 40, which may be made of a suitable plastic composition material or of any other suitable material, has a mirror 42 supported on its inner surface. To form a complete mirrored light entry tunnel or opening for the solar oven in the operative position, each side wall 40 has a trapezoidal corner wall 43 hinged thereto as at 44. Each corner wall 43 further has a mirror 45 on its inner surface.

The mirrored walls 40 and 43 are arranged to be folded, in substantially flat overlapping relation, to close the opening in the outer end 12 of the body 15. When the solar oven is to be placed in use, each of the walls 40 and 43 is folded outwardly so that the walls 40 will extend at an angle of substantially 60 degrees to the plane of the grill 25, suitable means being provided to maintain the walls in this position. The advantages of such a disposition are set forth in full in my Patent Number 3,025,851, issued March 20, 1962.

In the operation of the illustrated solar oven, the latter is tilted in the direction of the sun in such a manner that end wall 34 of pan 35 is normally lower than the end wall 33 thereof. In this position, the sun's rays pass through the transparent plates 17 and impinge upon the metal collector plate 25 which absorbs the solar rays. Light entering into the solar oven is reflected by mirrors 42 and 45 in such a manner that all of the solar energy is concentrated upon metal collector plate 25, thus to heat the food chamber 30 containing the food pan 35.

When cover 20 is swung open and food pan 35 is placed in position thereon, food may be placed in the food pan after which the cover may be closed so that the rim of pan 35 will have contact with the inner surface of collector plate 25. The oven is then tilted to a position where the sun's rays may most effectively enter into the oven.

As the food is heated, juices are generated from the heated food and these juices tend to run down bottom wall 31 of pan 35 to be collected along lower end wall 34 with its lip or flange 36, the end wall 34 with its flange 36 defining food juice retaining means. However, during heating of the food, some of the juices tend to run down tilted collector plate 25 and, due to the generally somewhat imperfect seal between the rim of pan 35 and coated surface 26 of collector plate 25, these juices will pass downwardly beyond the wall 34, fill crevices in the casing or drip outside the oven. When the oven cools down after use, these juices and fats congeal in cracks making cleaning of the oven a difficult task. With constant use, unpleasant food odors develop inside the oven due to the congealed juices and fats. The present invention is directed to food juice diverting means for preventing these undesirable conditions.

Figure 3:
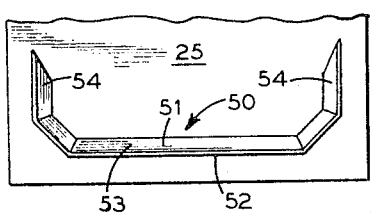
FIGS. 3 through 6 are bottom plan views of the collector plate illustrating different forms which the ledge means may take in practice.

One embodiment of the diverting means is illustrated at 50 in FIGS 1 and 3. The diverting means 50 illustrated in FIGS. 1 and 3 comprise ledge means which are angular in section, including a leg 51 which may be secured to collector plate 25 and leg 52 which extends substantially normal to the collector plate. Ledge 50 is so positioned that leg 52 thereof will extend into pan 35 just inwardly of the side and end walls of the pan. The particular ledge 50 illustrated in FIGS. 1 and 3 includes a portion 53 extending substantially the full length of the inner edge of flange 36 of the end wall 34 of pan 35, and shorter portions 54 extending upwardly along the inner surfaces of said walls 32 of pan 35.

With the illustrated arrangement, those food juices running down along the collector plate engage leg 52 of of ledge 50, particularly along the horizontal portion 53 thereof, and are diverted into pan 35 where they will accumulate against end wall 35 and lip or flange 36. Thus, all of the food juices developed during heating of the food are retained in the pan.

Figure 4:
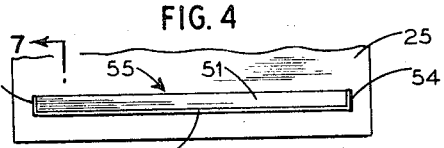

As illustrated particularly in FIG. 4, the side legs of 54 of ledge 50 may be omitted or reduced in length to mere short upturned end lips, and the ledge 55 in FIG. 4 extends only substantially parallel to and along the bottom end wall 34 of pan 35.

Figure 5:
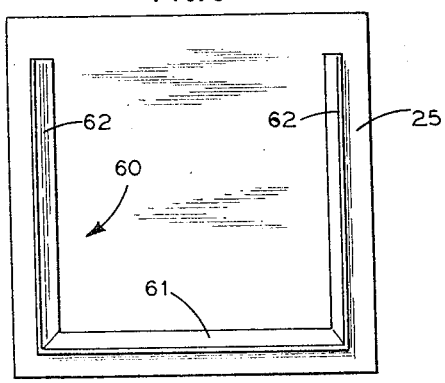

FIG. 5 illustrates a further embodiment of the ledge, which is also angular in cross-section including a leg lying against collector plate 25 and a leg extending perpendicular thereto. In the arrangement of FIG. 5, there is a portion 61 which extends through the full length of the lower end wall 33 of pan 35, and portions 62 which extend the full length of side walls 32 of pan 35, thus forming a ledge which extends throughout the length of three of the walls of pan 35.

Figure 6:
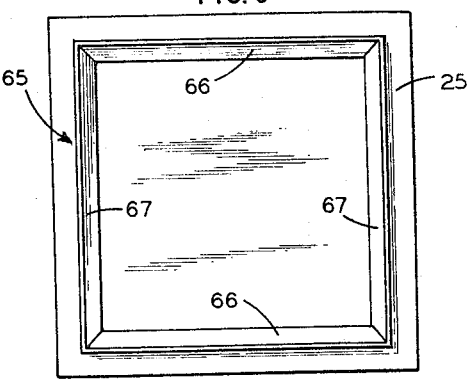

A further embodiment of the ledge means of the invention is shown in FIG. 6. In this case, the ledge 65 extends completely around the inner periphery of pan 35, and again is angular in cross-section with one angle leg lying against the surface of collector plate 25 and the other angle leg extending perpendicularly from the collector plate 25. Ledge 65 includes sections 66 which extend the full length of end walls 33 and 34 of pan 35, and sections 67 which extend the full length of the side walls 32 of pan 35, ledge 65 thus being substantially rectangular in plan.

The ledges 50, 55, 60 and 65 may be made of any suitable relatively stiff material. Thus they may comprise a plastic composition material such as a fluorocarbon or phenolic composition, as previously mentioned. In such case, the respective ledges may be secured to the inner surface of collector plate 25 by cementing with a suitable adhesive, such as that previously mentioned. However, the several ledges may also be made of a metallic material, such as a metal. In the latter case, the ledges may be riveted, welded, brazed, or cemented to the metal part of the collector plate 25. In each case, the ledges form an integral part of the collector plate 25. Also, in each case, the single or several legs of the ledges which project from the collector plate 25 are so positioned that they extend inwardly into pan 35 just within the inner peripheries of the side and end walls or the inner edge of the flange 36.

While more specific embodiment of the invention have been shown and described in detail to illustrate the application of the principles of the invention, it should be understood that the invention may be embodied otherwise without departing from such principles.

What is claimed is:

1. In a solar oven, casing means defining a chamber having a substantially flat heating collector plate; means for concentrating solar energy onto said collector plate to elevate the temperature of said chamber; said casing means, during operation of said oven normally being tilted from the horizontal in accordance with the position of the sun; a food pan positioned in said chamber and having side and end walls contacting said collector plate; the end wall of said pan normally lowermost when said casing means is tilted being formed to define retaining means for heated food juices running down the bottom wall of said pan; and a ledge extension projecting, from that area of the surface of said collector plate defined within the contacting side and end walls of said pan, into said pan adjacent the inner edge of said normally lowermost end wall to divert food juices, running down the surface of said collector plate, into said pan for collection in said retaining means.

2. In a solar oven, a ledge as defined in claim 1, said ledge being integral with said collector plate.

3. In a solar oven, a ledge as defined in claim 1, said ledge comprising an angular cross-section strip extending substantially the full length of said normally lowermost end wall of the pan, and including a first leg superposed on said collector plate and a second leg projecting from said collector plate.

4. In a solar oven, a ledge as claimed in claim 3, said strip including a first portion extending substantially the full length of said normally lowermost pan wall and second portions extending along the inner surfaces of the side walls of said pan.

5. In a solar oven, a ledge as claimed in claim 4, in which said second portion extends only part way of the length of the side walls of said pan.

6. In a solar oven, a ledge as claimed in claim 4. in which said second portions extend substantially the full length of said side walls of said pan.

7. In a solar oven, a ledge as claimed in claim 6, said ledge including a third portion interconnecting the ends of said second portion and extending substantially the full length of the normally uppermost side wall of said pan.

8. In a solar oven, a ledge as claimed in claim 1, said ledge being formed of metallic material.

References Cited by the Examiner

UNITED STATES PATENTS

| | | | |
|---|---|---|---|
| 738,986 | 9/1903 | Covert | 99—347 X |
| 1,809,580 | 6/1931 | Carter | 99—375 X |
| 2,590,942 | 4/1952 | Cornelius | 99—347 |
| 2,622,591 | 12/1952 | Bramberry | 99—347 X |
| 2,898,846 | 8/1959 | Del Francia | 99—444 X |
| 3,025,851 | 3/1962 | Steinberg | 126—270 |
| 3,053,248 | 9/1962 | Daymon | 126—270 |
| 3,106,201 | 11/1963 | Steinberg | 126—270 |

ROBERT E. PULFREY, *Primary Examiner.*

LAWRENCE CHARLES, *Examiner.*

W. VANSANTEN, *Assistant Examiner.*